United States Patent [19]

Armanno, Sr.

[11] Patent Number: 5,588,480
[45] Date of Patent: Dec. 31, 1996

[54] AUTOMOBILE HEAT TRANSFER APPARATUS

[76] Inventor: Frank Armanno, Sr., 14399 Picea Ct., Fort Pierce, Fla. 34951

[21] Appl. No.: 419,351

[22] Filed: Apr. 10, 1995

[51] Int. Cl.$^6$ ............................ F25B 29/00; B60H 1/08; B60H 1/32; F28F 7/00
[52] U.S. Cl. ........................ 165/300; 165/41; 165/80.1; 165/202; 62/244; 62/371; 62/377; 248/311.2
[58] Field of Search .............................. 165/41, 40, 80.1; 62/244, 371, 377; 248/311.2

[56] References Cited

U.S. PATENT DOCUMENTS

| | | | |
|---|---|---|---|
| 3,410,337 | 11/1968 | Priest | 165/41 |
| 3,757,851 | 9/1973 | Marble | 165/41 |
| 4,892,135 | 1/1990 | Sakurada et al. | 165/41 |
| 4,892,137 | 1/1990 | Bibik, Jr. | 165/41 |
| 4,892,138 | 1/1990 | Bibik, Jr. | 165/41 |
| 5,092,395 | 3/1992 | Amidzich | 165/41 |
| 5,181,555 | 1/1993 | Chruniak | 165/41 |
| 5,203,833 | 4/1993 | Howell | 165/41 |

*Primary Examiner*—John K. Ford

[57] ABSTRACT

A heat transfer apparatus designed to control the temperature of objects placed within the apparatus over a wide temperature range of 42 to 180 degrees F. utilizing as a heating and cooling source a combined heating and air conditioning system of the type which control the temperature of a living space over only a typically narrow temperature range of between 65 and 80 degrees F. While serving as the source for the heat transfer apparatus, the combined heating and air conditioning system can continue to serve its primary function of controlling the temperature of a living space without difficulty. In a preferred embodiment, no internal modification of the heating and air-conditioning system is required for it to operate with the present invention as well as perform its primary function.

4 Claims, 2 Drawing Sheets

5,588,480

AUTOMOBILE HEAT TRANSFER APPARATUS

BACKGROUND OF THE INVENTION

1. Field of the Invention

The present invention relates to heat exchangers and more particularly to heat exchangers design to control the temperature of food and medicine transported in personal vehicles.

2. Description of the Prior Art

During long trips in personal vehicles, the most common method currently used for transporting food or medical items that require refrigeration, such as cold drinks or insulin, is to place such items in an insulated box with ice. Most thermally insulated boxes are intended for use at outdoor meals where several people are expected to be present. Since these boxes are designed to hold the food requirements of several people along with sufficient ice for long trips to keep the contents cool for the duration of the trip, they are generally relatively large and occupy considerable space in the vehicle. These boxes are usually kept in the cab of the vehicle where they occupy seat or floor space, often resulting in the discomfort of the passengers. As a trip progresses, the ice melts flooding the bottom portion of the insulated box which requires the food to be packaged such that it cannot be affected by the water, or the water has to be disposed of as the trip progresses. Although dry ice can be substituted for ice produced from water to avoid this problem, it is not readily available.

A less common alternative system for providing refrigeration in personal vehicles uses a similar sized insulated box with a battery operated electrical refrigeration unit. These electrically powered refrigeration units typically plug into the cigarette lighter socket in vehicles to obtain power. Unfortunately, the refrigeration capability is often poor and provides disappointing results, especially during hot weather and on long trips. Added to the problems produced by the bulk of the insulated box is the complication and confining effects of a power cord which often is draped over the front seats to reach an insulated box located on a back seat of the vehicle.

Other than the thermos bottle, there is little that is generally available to keep items such as hot drinks hot for long periods. With thermos bottles, the temperature slowly drops over a period of time until the drink becomes unpalatable. There is no source of heat to make up for the constant loss of heat through the thermos bottle wall and eventually on a long trip the contents can no longer be used.

As presently configured, the heating and air conditioning systems generally found in most vehicles provide little aid in serving as a source of heating or cooling for food or medicine. Such systems are designed to maintain the ambient of the cab of a vehicle within a temperature range of 65 to 80 degrees F. Typically desired temperatures for food are 45 degrees F. for cold food and 140 degrees F. for hot food. The cab temperatures achieved with standard heating and air conditioning systems for vehicles ranges from 20 to 60 degrees away from these desired hot and cold food temperatures.

There is a need to provide a system to accomplish both the heating and refrigeration of food or medicine to desired temperatures while avoiding the bulk, confinement, complication and cost of currently available systems.

SUMMARY

An object of the present invention is to provide a small, rapid and convenient system for controlling the temperature of items such as food and medicine in personal vehicles.

An object of the present invention is to provide in a personal vehicle a system for cooling items which does not require ice, a refrigeration system, or electrical power.

An object of the present invention is to provide a system for heating items to 180 degrees F. continuously and without connection to the electrical system of a personal vehicle.

An object of the present invention is to utilize the capabilities of standard heating and air conditioning systems in personal vehicles to provide temperature control of items such as food or temperature sensitive medical supplies continuously over a wide temperature range from 42 degrees F. to 180 degrees F., despite the limited interior environmental control range of 65 degrees F. to 80 degrees F. over which such standard heating and air-conditioning systems normally operate.

An object is to provide wide temperate control of items utilizing a standard heating and air conditioning system in personal vehicles without appreciably affecting the performance of the standard system for its primary purpose.

In the present invention, an enclosure with an input port and an exit port is positioned with the input port over a heating and air conditioning vent in a personal vehicle to accept the air flow from the vent into the enclosure. The invention is easily installed by means of a quick connect--disconnect system. No internal modification of the standard heating and air-conditioning system is required. Items to be heated or cooled are placed in the enclosure. The air flow through the enclosure to an exit port is controlled to produce efficient heat transfer from the air flow to the items contained within the enclosure. The temperature of the items within the enclosure is controlled by a series of valves, the support bed for the items, and the material, size and contours of the enclosure.

DETAILED DESCRIPTION OF THE INVENTION

Figure 1:
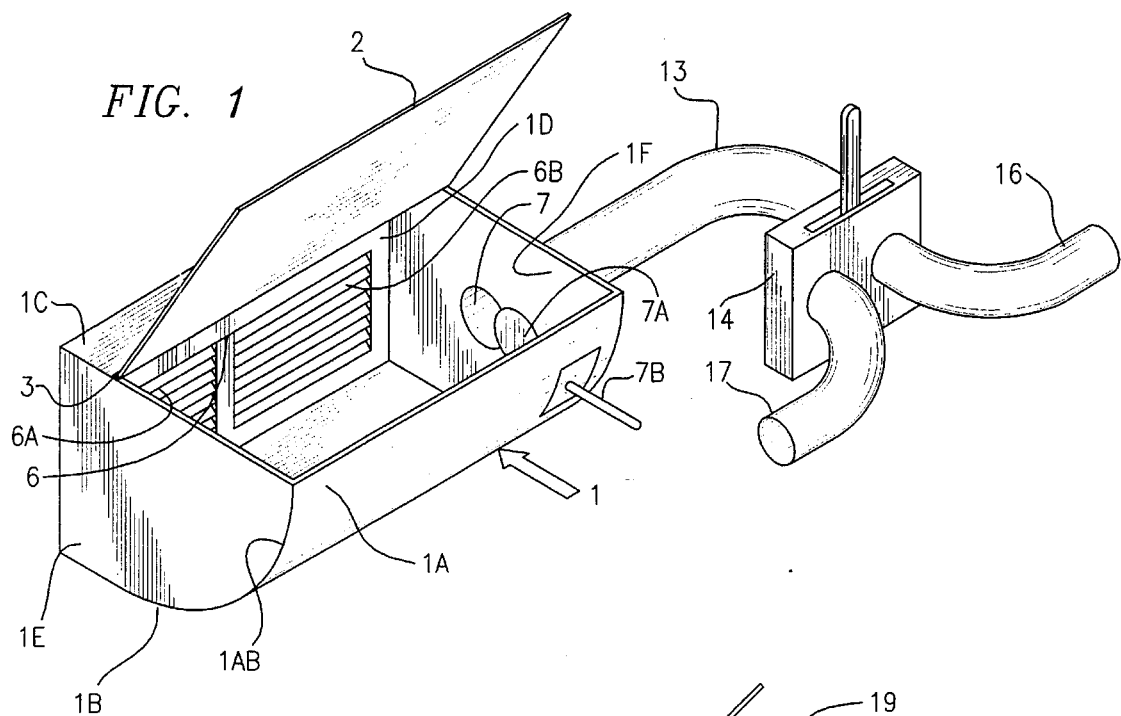
FIG. 1 is a perspective view of a preferred embodiment of the present invention, showing the invention to include a temperature controlled enclosure placed in a typical mounting location over the air conditioning vents in a vehicle.

FIG. 1 is a perspective view of the invention. This view shows the invention to be comprised of an enclosure 1, which basically is formed of six sides, a front 1A, a bottom 1B, a top 1C, a rear 1D, a left side 1E, and a right side 1F. In this basic configuration, opposite sides are parallel and adjacent sides are orthogonal. In the particular embodiment shown in FIG. 1, all adjacent sides of the enclosure are orthogonal, with the exception of the the front and bottom. The front and bottom join in a curved section, identified by drawing numeral 1AB. The curved section 1AB, is used to direct the flow of air within the enclosure and will be discussed in greater detail in connection with FIG. 2. The enclosure further comprises a rotatable cover 2, located on the top side of the enclosure, a hinge 3 for rotatably connecting the cover to the top side of the enclosure, and a first aperture 6 located on the rear side 1D of the enclosure.

Aperture 6 is designed to generally match the size of a heating and air conditioning vent 6A, usually located on the dashboard of vehicles. This aperture permits air from the heating and air conditioning unit to enter the enclosure. A single larger aperture or multiple smaller apertures may be made in the rear of the enclosure to capture a greater amount of input air in instances where closely spaced multiple vents are present. In FIG. 1, a single, larger aperture 6 is used to cover two heating and air conditioning vents 6A and 6B.

Figure 2:
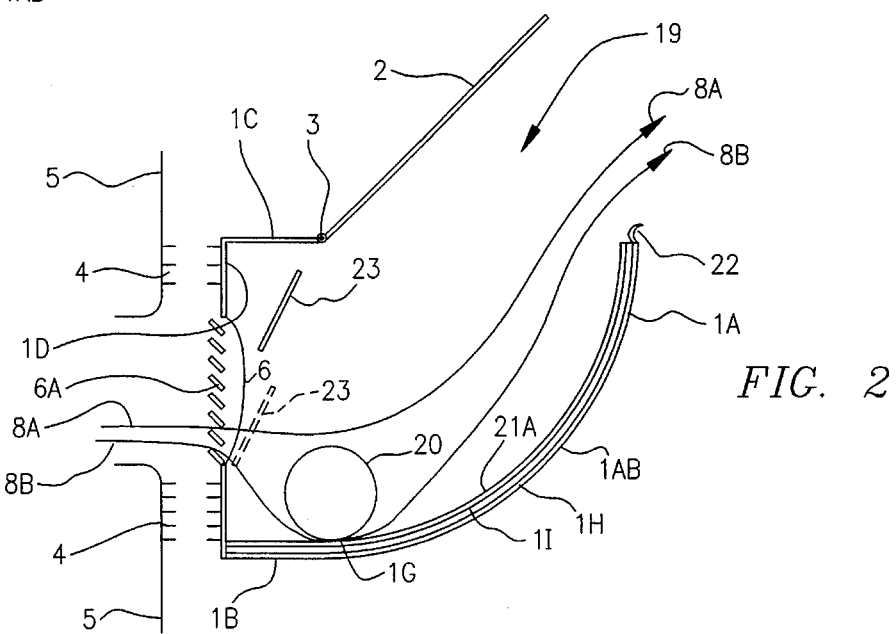
FIG. 2 is a sectional side view of a preferred embodiment of the present invention showing the location of an object to be cooled and the paths of air flow through the invention.

FIG. 2 is a cross sectional view of the enclosure shown in FIG. 1. This Figure shows the generally flat and vertical portion of the front of the enclosure 1A, the generally flat and horizontally positioned bottom of the enclosure 1B, the curved transitional portion 1AB of the enclosure which joins 1A and 1B, the top of the enclosure 1C, the rear of the enclosure 1D, a point of contact 1G on the bottom of the enclosure between an object to be temperature controlled 20 and a heat conductive liner of the enclosure 1I, the rotating cover of the enclosure 2, the hinge 3 for attaching the rotating cover 2 to the top of the enclosure 1C, fiber attachment means 4 to attach the enclosure to the dashboard 5 of the vehicle about the heating and air conditioning vent 6A, the first aperture 6 in the rear of the enclosure 1D encompassing the heating and air-conditioning vent 6A, a first portion 8A of an air stream emitted from the heating and air conditioning vent 6A which enters the enclosure through the aperture 6 and exits the enclosure through a second aperture 19 that is produced by the opening of the cover 2, a second portion of the air flow 8B through the enclosure, a top surface 21A of the liner 1I used to support objects to be temperature controlled, such as object 20, a spring catch 22 to hold the cover 2 in a closed position, and a diverter plate 23 to deflect air away from the object to be temperature controlled.

In FIG. 2, the enclosure is attached to the dashboard over a heating and air conditioning vent by means of an intermeshing fiber attachment system, such as the system available under the trade name of Velcro. The intermeshing fiber system is attached about the vent on the dash board and to the back of the enclosure about the aperture 6. This attachment system permits the enclosure to be installed and removed in a few seconds without the use of tools. Many alternative systems of attachment are available. Some of these systems include permanent attachment by directly securing the enclosure to the dashboard using fasteners such as sheet metal screws. Permanent installation may also be made either behind or beneath the dashboard at the factory as original equipment or later in the field as an added accessory. Access to the enclosure installed behind the dash board can be by means of a door in the dash board or by a pull-out drawer containing the enclosure. Removable installation can be made to the dash board by a second securing system using two sets of mating brackets, with the first set of mating brackets being permanently attached to the dash board while the second set of mating brackets is installed on the back of the enclosure.

In the operation of the heat transfer unit, the enclosure is attached in place over an air vent of the heating and air conditioning systems of the vehicle using, for example, one of the methods described above. The cover 2 is raised and the object to be temperature controlled is passed through aperture 19 made by raising the cover 2. The object is then placed on the bottom of the enclosure. The cover is left unsecured so that an air stream impinging on the cover will force it upward and thereby automatically produce the second aperture 19 in the enclosure for as long as air passes through the enclosure.

The air entering the enclosure through the aperture 6 from the heating and air-conditioning system vent 6A generally divides into two airstreams 8A and 8B. The first airstream 8A flows over the object to be temperature controlled 20 to the second aperture 19. The second airstream 8B impinges on the object 20 and then flows beneath and about the sides of the object to rejoin the first airstream 8A and exit the enclosure through the second aperture 19. The rejoined airstreams 8 and 8A combine on exiting the enclosure to form a single air stream as the air flow departs the enclosure at aperture 19.

In FIG. 2 it can be seen that the airstream 8A has a relatively clear path between the first and second aperture. However, the airstream 8B proceeds down and under the object to be temperature controlled and then upwards along the surface of side 1AB to the second aperture. If the surface 1AB were not curved, the airstream 8B would meet a flat wall which would be a downward projection of enclosure side 1A. The impinging of airstream 8B on a flat wall would result in turbulence and eddy currents. The turbulence would reduce the velocity of the emitted air stream from aperture 2 and thus reduce the efficiency of the vehicles heating and air conditioning system in performing its primary function of controlling the internal temperature of the vehicle. This problem is avoided in the present invention by use of a curved surface 1AB.

Heat is transferred between the object to be temperature controlled and the air flow through the enclosure by direct and indirect conduction. Direct conduction occurs due to the direct contact of the airstreams with the object. Indirect conduction occurs by means of the contact of the object with the enclosure. The enclosure is made of a heat conductive material such as aluminum. The air flow through the enclosure not only makes contact with the object to be temperature controlled as described above, but also with the inside surfaces of the enclosure, transferring heat to, or withdrawing heat from the enclosure itself. The surface area of the interior of the enclosure is larger than that of the object to be temperature controlled, making possible a substantial transfer of heat between the airstreams and the enclosure. The object to be temperature controlled lies on the interior bottom surface of the enclosure and by means of this contact with the enclosure, heat transfer occurs between the object and the enclosure. The combined heat transfer occurring due to both direct and indirect conduction far exceeds that which can be obtained through direct conduction alone. Without the use of the enclosure it is difficult to reach the temperature range of 42° F. to 180° F. which is regularly achieved with the enclosure.

It may at first may not appear that such low and high temperature air streams are emitted from a vehicle's heating and air conditioning system, but such temperatures are in fact reached at the vent. However, they are quickly dissipated as the air stream from the vent mingles with the relatively large volume of air in the cab or interior of the vehicle. The enclosure of the present invention traps the air stream from the vent before the temperature of the emitted air stream is lost and efficiently transfers the heat to, or withdraws the heat from, the object to be temperature controlled.

It is important to note that in most applications the addition of the enclosure of the present invention and the presence of the object to be temperature controlled have little to no adverse affect on the performance of the heating and air conditioning system for its intended function of controlling the interior temperature of the vehicle. This is due to the fact that in most instances any heat transfer between the enclosure and the interior of the vehicle only aids the heating and air conditioning system perform its intended function. For example, during warm weather, the air conditioning portion of the heating and air conditioning system can be expected to be in use and the present invention can be expected to be used to cool an object placed in the enclosure.

Cooling transferred to the enclosure which subsequently leaks off from the enclosure, does so to the interior of the vehicle, aiding the air conditioning system to perform its function. Any back pressure produced by the enclosure is easily overcome by a higher fan setting on the heating and air-conditioning system.

It usually takes from five to ten minutes for an object within the present invention to reach a desired temperature. The transfer of heat is relatively slow and therefore it has little effect on the performance of the air conditioning system during the initial phase of cooling the object. Once the desired temperature has been reach, no transfer occurs, except to compensate for leakage from the enclosure and as already mentioned, such leakage usually aids the air conditioning system perform its function.

Figure 6:
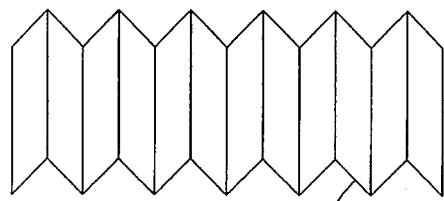
FIG. 6 is a pictorial view of a liner for the enclosure designed to support the object to be temperature controlled, while permitting air to flow about the object.

FIG. 6 shows a heat conductive liner 21 for the enclosure which has a wave-like cross section. As shown in FIG. 2, this liner is placed on the bottom of the enclosure to support the object to be temperature controlled and to provide passages under the object for the airstream 8B to flow. The flow of air beneath the object effect a more efficient heat transfer between the air stream and the object. This liner also acts as a means of conductively transferring heat between the enclosure and the object. A number of alternatives for this liner are possible such as rails, tracks, or heavy wire mesh.

Figure 3:
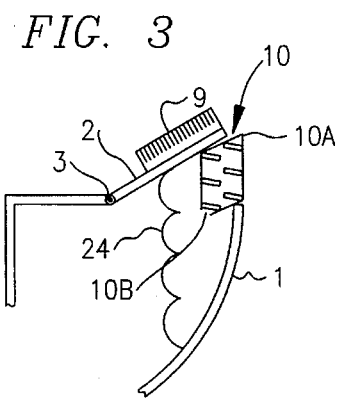
FIG. 3 is a sectional side view of the present invention showing the location of a control mechanism for air exiting the enclosure and louvers to direct the air flow as it leaves the enclosure and enters the cab of the vehicle.

In most instances, the relatively simple arrangement for controlling the flow of air through the enclosure as shown in FIG. 2 is satisfactory. Cold drinks are kept cold in the summer and warm drinks are kept warm in the winter. However, there are instances where a more precise control of temperature is desired. In such instances, the flow of air through the enclosure must be more accurately controlled. A first relatively simple control which adjust the constricting action of the cover 2 and thereby adjusts the size of the second aperture 19 is the weight of the cover. The weight of the cover must be overcome by the air stream exiting the enclosure. The greater the weight of the cover, the greater the force available to close the cover and to reduce the aperture size. FIG. 3 shows a way in which weight can be added to the cover to adjust the aperture size. In this Figure, the cover 2 is shown in its open position above the enclosure 1. Added to the top of the cover is a weight 9 designed to produce a desired total weight for the cover and to provide a particular aperture size for air exiting the enclosure. An alternative to the weight for applying closing pressure on the cover is a spring, such as spring 24, connected as shown in FIG. 3 between the cover and the front of the enclosure.

The pressure of air exiting the enclosure also has an influence on the size of the aperture and this pressure is usually determined by the demand on the heating and air conditioning system to heat or cool the interior of the vehicle. For example, on a particularly warm day, the air conditioning system can be expected to have its blower running at high speed, especially initially, when the interior of the vehicle may be hot because the vehicle had been standing in the sun for an appreciable period of time without the benefit of the air conditioning system. At such times, the high pressure and accompanying high speed of the air flow produce a high cooling rate within the enclosure and the interior of the vehicle.

This high cooling rate is exactly what is needed by both the object to be temperature controlled and the interior of the vehicle in order for both to overcome the high temperature of the environment in the interior of the vehicle. Once the interior of the vehicle has been cooled to a temperature that is comfortable for the passengers, the air condition system's blower automatically slows down, reducing the pressure and the cooling effect. This is again what is needed for both the object to be cooled and the interior environment of the vehicle. The environment in the vehicle and the object are now cooler and closer to their desired temperatures because of the initial high cooling rate provided by the air conditioning system. At this point, both require less cooling to maintain their desired temperatures. In this sense, the present invention in conjunction with the vehicle's heating and air conditioning system operate to automatically provide the correct rate of air flow through the enclosure to rapidly bring the object to be temperature controlled to its desired temperature.

The covers position is also automatically adjusted by the rate of air flow through the enclosure. The covers position automatically rises as the air flow and air pressure increase. The raised cover position provides a larger aperture and a means for releasing the greater amount of air flow from the enclosure. The covers position is important to the amount of heat transfer from the air flow through the chamber and the object to be temperature controlled. This can be seen by noting in FIG. 2 that if the cover were raised to a vertical position to provide a maximum second aperture size, there would be little to cause the air within the enclosure to flow about the enclosure or under the the object to be temperature controlled. There would be a relatively unobstructed path to a wide open exit port for the air flow. The back pressure produced by the restricted second aperture on the air flow causes the air flow to be diverted from a direct path to the exit port, to flow along other paths such as the one followed by airstream 8B.

Just as a wide open second aperture would be harmful to the heat transfer within the enclosure so would a completely closed second aperture In that case, there would be no flow of air through the enclosure and no heat transfer. There is clearly an optimum second aperture size for each rate of air flow and desired temperature of the object to be temperature controlled. Although the general direction in which the cover moves as the rate of air flow changes is automatically in the desired direction to aid in optimizing heat transfer within the enclosure, the correct position for a particular flow rate must be determined for each system. A direct first order adjustment to setting the correct second aperture size is to adjust the size of the weight 9, while monitoring the temperature of the object to be temperature controlled for different flow rates through the enclosure. Once the optimum weight is determined, it can be permanently added to the cover or a cover can be designed to have the overall desired weight for optimum heat transfer. A suitable alternative to adding weight to the cover in order to providing a restraint on the cover's movement is to apply spring tension between the cover and the top of the enclosure 3 as shown in FIG. 3..

The size of the enclosure is also important in providing optimum heat transfer. Too large or two small an enclosure will result in less than optimum results in obtaining the desired temperature of the object to be temperature controlled. This can be understood by noting that a very small enclosure would not have sufficient room to pass the full air flow from the vent nor have sufficient room to hold a large object to be temperature controlled. There also would be relatively less surface area within the enclosure with which to effect efficient heat transfer.

Too large an enclosure results in the object to be temperature controlled being located at a significant distance from many of the surfaces of the enclosure. Heat transmitted through the enclosure to the object to be temperature controlled must pass over a relatively longer distance increasing the thermal resistance and the loss of heat through radiation and conduction to the outside of the enclosure. In addition, the air flow through the enclosure would pass well above the object to be temperature controlled, without any appreciable heat transfer. Some of these problems can be corrected with ducting and brackets to support the object to be temperature controlled in a position to be in contact with the air flow through the enclosure and insulation can be used to cover the outside of the enclosure, such as the insulation jacket 1H shown in FIG. 2; however, these added structures add to the cost of the heat transfer unit and in many cases can be dispensed with if an optimum size enclosure is chosen.

It has been found experimentally that the optimum size for most conventional passenger vehicles ranges from an enclosure with dimensions of 4"×4"×4" to one with dimensions of 6"×8"×10". These dimensions are listed to provide an approximate volume and are not intended to limit the invention in any way nor do they imply a strictly rectangular configuration. Larger and smaller enclosures are possible and nonlinear contours, such as the curved contour of side 1AB are in some instances desirable and recommended. In particular 1AB aids in conducting the air flow through the enclosure with the least resistance, while providing good heat transfer between the air flow and the object to be temperature controlled. The insulation jacket 1H is not required, but is desirable because it retains the desired heat level within the enclosure. It also helps to attain extremes in temperature levels. For example, the insulated jacket was required to reach 42 degrees F. within a prototype enclosure.

FIGS. 2 and 3 show systems where the size of the second aperture is automatically determined by the weight and size of of the rotatable cover 2, or by spring pressure, but there are still other methods of controlling this aperture. FIG. 3 shows an additional grill 10 with adjustable louvers placed in the second aperture. When using this grill, the cover is raised a fixed amount and secured in that position. Then the grill is secured in place in the second aperture. The securing in place of the grill can be accomplished in a number of ways, including permanently attaching the top of the grill to the forward edge of the cover and clipping the bottom of the grill to the top of the front of the enclosure 1A. This method of securing the grill also secures the cover in a fixed position. The grill shown includes a first set of louvers 10A located towards the front of the aperture, and facing out of and away from the enclosure, and a second set of louvers 10B, located towards the rear of the aperture and facing back into the enclosure. The first or second set of louvers can be adjusted to effectively close or open the second aperture, even though the cover 2 remains stationary.

A useful arrangement is to employ the second set of louvers to adjust the effective size of the aperture, while using the first set of louvers 10B to provide direction to the the flow within the vehicle. In this way, the advantage of directing air flow within a vehicle by means of the louvers normally found in the heating and air conditioning vent covered by the enclosure is restored by the first set of louvers 10A.

Figure 5:
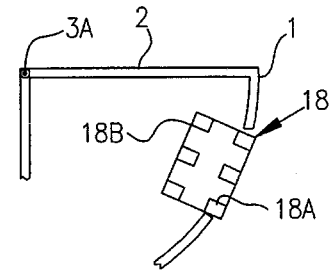
FIG. 5 is a sectional side view of the invention showing an alternative air exiting control mechanism which combines a valve means and air flow directional control mechanism built into the temperature controlled enclosure.

As shown in FIG. 5, a second grill 18 mounted in a cut-out made in the front of the enclosure in side 1A and the curved side 1AB contains a set of louvers 18A in the front of the grill and a another set of louvers 18B in the rear of the grill. In the operation of this arrangement the louvers operated as they did in FIG. 3. The rear louvers 18B are generally used to control the air flow through the enclosure, while the front louvers are used to direct the flow of air within the vehicle. When using this arrangement, the cover 2 remains closed. This arrangement is particularly advantageous for factory installed or in-the-field accessory installations where the enclosure is connected to vehicle beneath the dash board or through the dash board in a drawer-like arrangement which can be is easily pushed back into the dashboard and out of the way, but where it continues to provide its heat transfer function. In this arrangement, there is never a permanently raised cover that could become an impediment to the drawer-like movement of the enclosure. Air from the heating and air condition system of the vehicle is supply to the rear of the enclosure at the first aperture by means of a flexible hose to facilitate the movement of the enclosure, which generally occurs only when the operator wishes to access the interior or the contents of the enclosure.

Figure 4:
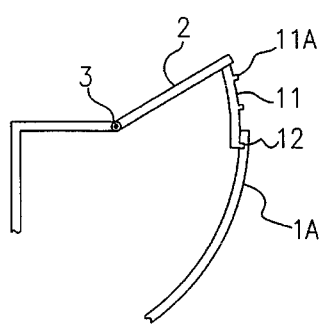
FIG. 4 is a sectional side view of the present invention showing one alternative air control mechanism for adjusting the amount of closure of the air exit port.

A simple and very positive way to control the size of the second aperture is a manual control arrangement shown in FIG. 4. In this Figure, a generally vertical tab 11 is made of resilient material such as spring steel connected at its upper end to the underside of the cover 2. This tab contains a series of projections, such as projection 11A, which extends outward from the tab in the second aperture in the direction of the air flow leaving the aperture. Side 1A of the enclosure includes a cavity 12 having its opening on the inside of the enclosure which is aligned with and proportioned to closely receive the projections on tab 11. In the operation of this arrangement, the tab is pushed slightly back towards the aperture 19 and away from the side 1A to pass the projections on tab past the cavity 12, until the desired second aperture size is reached. At that point, the pressure applied to the tab is released and a projection on the tab enters the cavity, locking the cover 2 at a desired position and thereby manually setting the size of the second aperture It is possible to use the present invention to heat the object to be temperature controlled while cooling the interior of the vehicle. It is also possible to cool the object to be temperature controlled while heating the interior of the vehicle. This is referred to as reverse mode operation, or simply reverse mode. In a first method, these seemingly conflicting functions are primarily carried out by time sharing the output of the vehicles heating and its air conditioning system and by exhausting air to the outside of the vehicle from the enclosure that is of a temperature not desired in the interior of the vehicle.

Means for accomplishing the first method of reverse mode operation is shown in FIG. 1. The components used in this mode include a third aperture 7 located in the right side 1F of the enclosure 1, a shut off valve 7A for aperture 7, a control lever 7B for this valve, a first exhaust conduit 13 connected at a first end to the aperture 7, an exhaust distribution valve 14 connected to the first exhaust conduit 13 at its second end, a control lever 15 for valve 14, a second exhaust conduit 16 and a third exhaust conduit 17. Conduits 16 and 17 are connected at one end to the exhaust distribution valve 14. The remaining end of conduit 16 is connected to a panel such as the fire wall which will exhaust air outside of the interior of the vehicle. The remaining end of exhaust conduit 17 exhaust directly into the interior of the vehicle.

When the present invention is operated in the reverse mode, as for example when it is desired to heat the object to be temperature controlled while cooling the interior of the vehicle, the following sequence of events occur. Air is either prevented from flowing through the enclosure by closing louvers at the first aperture or it is diverted away from the object to be temperature controlled by inserting a diverter plate, such as diverted plate 23 shown in FIG. 2, down in front of the first aperture, as indicated by the dashed line position of diverter plate shown in this Figure. In the dashed line position of diverter plate 23, air entering the enclosure from aperture 6 is diverted upward and around the object to the temperature controlled.

The air conditioning portion of the vehicles heating and air conditioning system is then activated and the cool air diverted around the object to be temperature controlled passes through the enclosure to aperture 7 on the side of the enclosure. The cover 2 is closed and cool air leaves enclosure 1 by aperture 7, conduit 13, valve 14 and conduit 17 from which it is exhausted into the vehicle to cool the interior. Valves 7A and 14 are set to provide this exhaust path during the cooling operation. The interior of the vehicle is usually cooled within less than five minutes and typically within two to three minutes. As soon as that has been accomplished, the air conditioning system is shut off for a like period of typically two to three minutes. Where the air-conditioning portion of the system cannot accommodate short cycles of on and off time, the air-conditioning system can be left on, but its output must be directed entirely within the vehicle.

The interior of the vehicle can usually be cooled sufficiently before it is shut off for it to remain at a comfortable temperature for two to three minutes without cool air being supplied. In large measure, this is what occurs during normal operation of the air conditioning system in a vehicle. Once a comfortable temperature is reached, the supply of cool air is very substantially cut back, usually by a large reduction in the speed of the air conditioning system's fan.

At the point in the reverse mode cycle when heat is to be applied, the valve 14 is set to exhaust the air from the enclosure to the outside by way of conduit 16 and the diverter plate is raised to permit air to flow about the object to be temperature controlled. The interior of the vehicle was previously brought to a temperature that is comfortable for the passengers. Now, the temperature of the air from the heating system and air-conditioning system has been reversed and hot air is fed through the enclosure for typically two to three minutes, which is generally sufficient to start the heating cycle and significantly raise the temperature of the object to be temperature controlled. The hot air is exhausted through conduit 16 to the outside of the vehicle. Then the temperature of the heating and air conditioning system is again reversed and the cool air is directed to the interior of the vehicle through conduit 17. This cycle or time sharing process is continued until the vehicle has been cooled to a desired temperature and the object to be temperature controlled has been heated to its desired temperature.

Temperature sensors within the enclosure and the interior of the vehicle can be employed to automatically adjust the cycle time of heating and cooling to provide optimal results. These sensors can also be used to control aperture sizes to further optimize the efficiency and rate at which temperatures are reached within the enclosure and the vehicle. It is well know to those skilled in the art as to the method by which such sensors can be used to automatically reached different and even diverse desired temperatures in the enclosure and the vehicle. Heating the vehicle while cooling the enclosure can be achieved by using the same reverse mode operation. However, in this case, the actuation times of the heating and cooling sections of the vehicles heating and air conditioning system are reversed with respect to the valve positions.

Figure 7:
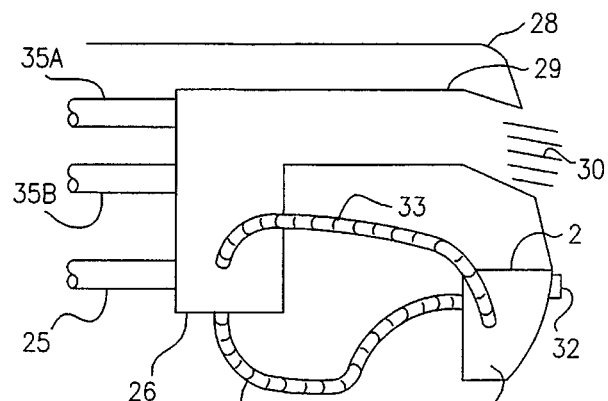
FIG. 7 is a sectional side view of the invention built into the dash board of a vehicle.
Figure 9:
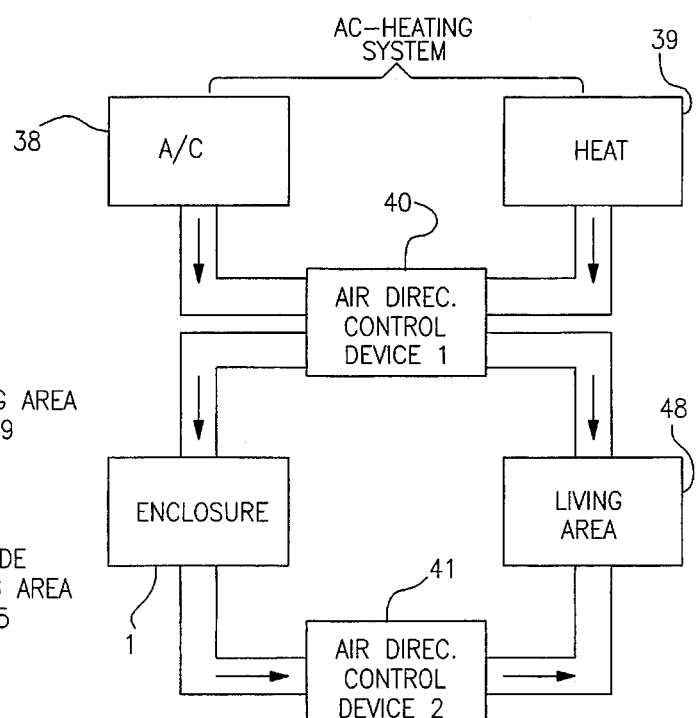

Most combined heating and air conditioning systems in vehicles and in buildings are really two systems, a separate heating and a separate air conditioning system with only a single delivery or blower and duct system. It is therefore possible to modify the design of a combined heating and air conditioning system to have the heating portion and the air conditioning portion of this system system on at the same time with one controlling the temperature of a vehicle's cab while the other controls the temperature of the enclosure. The only major item necessary to produce to such modified system is the addition of a second blower and a second delivery duct With such a modified system, time sharing would be unnecessary. A system of this type is shown in FIG. 9. This system is shown schematically to help clarify its mode of operation. A system which is more detailed and is intended specifically for use in a personal vehicle is shown in FIG. 7 and is described below.

The major components of the system shown in FIG. 9 include a heating and air conditioning system made up of an air conditioning portion 38 and a heating portion 39, a first air direction control device 40 a second air direction control device 41, an enclosure 1 to hold an object to be cooled or heated, a living area 48, such as the cab or interior of a passenger vehicle, and an exhaust port 47 connected to an outside area 49 located outside of the vehicle to exhaust air outside of the living area of the vehicle.

Figure 10A:
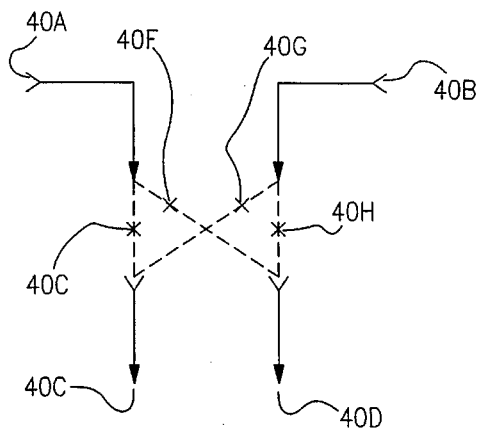

The first air direction control device is shown schematically in FIG. 10A to include a first input port 40A, a second input port 40B, a first output port 40C and a second output port 40D, a first valve 40E, a second valve 40F, a third valve 40G and a forth valve 40H. In this device, the first valve connects the first input and first output ports, the second valve connects the first input and the second output ports, the third valve connects the second input and the first output ports and the forth valve connects the second input and the second output ports. All these valves either permit air to pass from one port to another or they block the flow of air between ports. There are a number of ways in which such valves can be implemented. A simple way to implement such a valve, which is in common use, is to rotatably position a vane in an air conduit such that the vane is parallel to the air flow when the valve is to be opened and the vane is placed across the air flow to block the flow when the valve is to be closed.

In the operation of the first air direction control device, an input port is connected to one of the of either of the output ports, but not to both ports at the same time. The second input port can be shut off or can be connected to the remaining input port which is not connected to the first input port. In a first example, the first input port is connected to the first output port via the first valve, while the second input port can be connected to the second input port via the forth valve. In this case, the second and third valves would be shut off to prevent any mixing of the input air flows which are at different temperatures, one being cool air from the air conditioning portion and the other being hot air from the heating portion. In a second example the first input port is connected to the second output port, while the second input port is connected to the second output port. This is accomplished by opening the second and third valves while closing the first and forth valves. These valve openings and closings to effect a particular arrangement can be accomplished in a number of ways. Simple mechanical interlocking drive mechanism is an often used method. Alternatively, the valves can be driven by selenoids or electric motors with the desired openings and closings for a particular result being controlled by a logic circuit.

Figure 10B:
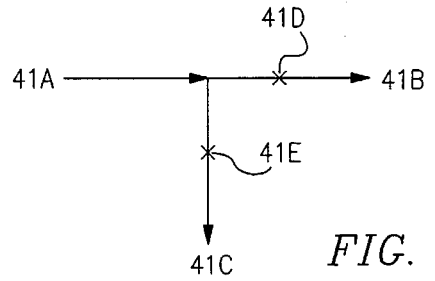

The second air control device 41 is shown schematically in FIG. 10B to include an input port 41A, a first output port 41B, a second output port 41C, a first valve 41D in the first output port, and a second valve 41E in the second output port. In the operation of the second aircontrol device, air from the enclosure enters the input port 41A and is passed to either the first output port 41B and on to the living area or to the second output port 41C and exhausted to the outside of the living area as determined by the setting of the valves 41D and 41E.

The major components in the system of FIG. 7 include an air direction control device 26, a first flexible duct 27, a second flexible duct 33, a rigid duct 29, a set of louvers 30, an enclosure in the form of a drawer 34, a cold air in take conduit 35A, a hot air intake conduit 35B, and an air exhaust conduit 25.

Figure 8:
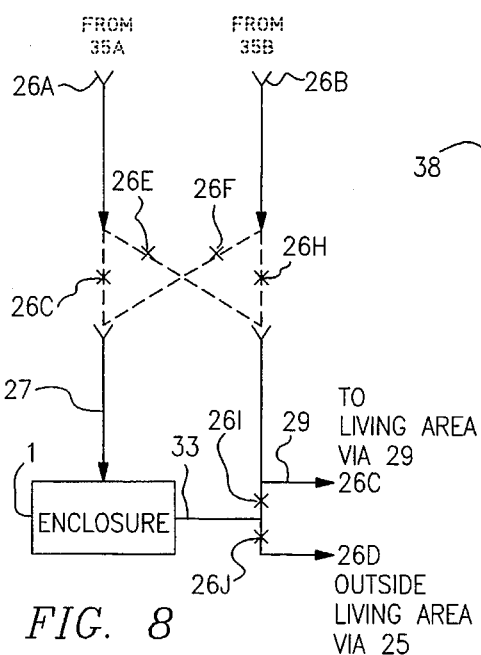
FIGS. 8, 9, 10A and 10B are schematic illustrations of the air control device 26, the major components of the system and the first and second air control devices, respectively.

The internal components of air direction control device 26 is shown schematically in FIG. 8 to include a first input port 26A connected to cold air intake conduit 35A, a second input port 26B connected to hot air intake conduit 35B, a first output port 26C connected to the living area via rigid duct 29, and a second output port 26D connected to an area outside the living area via exhaust conduit 25.

The air direction control device 26 further includes valves 26E, through 26J. Valve 26E is located between input port 26A and duct 29. Valve 26F is located between input port 26B and duct 27. Valve 26G is located between inputport 26A and duct 27. Valve 26H is located between input port 26B and duct 29. Valve 26I is located between duct 29 and duct 33. Valve 26J is located between duct 33 and exhaust conduit 25.

In the operation of the system shown in FIG. 7, when reverse mode operation is desired, cold air received through conduit 35A is directed by air directional control device 26 through duct 29 to the interior of the vehicle. Hot air received through conduit 35B is fed by way of the air direction control device 26 through duct 27 to the enclosure where it heats the contents of the enclosure. The hot air is removed from the enclosure by way of duct 33 air direction control device 26 and exhaust conduit 25 to the outside of the vehicles interior. The valves within the airdirection control device 26 are actuated to provide thes paths and block off extraneous paths. For example to deliver hot air from conduit 35B to the enclosure valve 26F is opened and valves 26G and 26H are closed. To exhaust hot air from the enclosure, valve 26J is opened and valve 26I is closed.

The enclosure is in the form of a drawer mounted in the dashboard of the vehicle 34 and can be pulled out to insert items by way of lifting open top cover 2. The major advantages of this system are obvious. The entire enclosure is out of the way behind the dash board, but can be accessed quickly by pulling out the drawer enclosure and normal or reverse mode operation can be carried out without the need for time sharing.

Having described my invention, I claim:

1. Apparatus for controlling the temperature of objects over a wide temperature range, typically between 40 and 80 degrees F., using as the source of heating and cooling a heating and air conditioning system designed to maintain a relatively narrow range of room temperatures, typically between 50 and 70 degrees F., said apparatus maintaining said wide temperature of said objects while said heating and air-conditioning system maintains said narrow range of room ambients, said heating and air-conditioning system having a vent through which issues a first air stream, said air stream being generally above room ambient when the heating portion of said heating and air-conditioning system is activated and is generally below room ambient when said air-conditioning portion of said heating and air-conditioning system is activated, said apparatus comprising:

(a) An enclosure to hold said objects, said enclosure having a plurality of sides, (b) a first side of said enclosure having a first aperture, said first side being positioned opposite said vent of said heating and air-conditioning system with said first side oriented to place said first aperture in a location to capture at least a portion of said first air stream for entry of said first air stream into said enclosure, (c) means for securing said first side in said position opposite said vent, (d) a second side of said enclosure, said second side having a second aperture, said second aperture releasing air from said enclosure which entered said enclosure through said first aperture, said air released from said said second aperture forming a second air stream, (e) a third side of said enclosure to hold said objects in said enclosure and subject said objects to said first air stream to control the temperature of said objects by means of heat transfer between said objects and said first air stream, (f) a plate rotatably connected to said enclosure, said plate having a rotational path with respect to said enclosure and said plate being positioned on said enclosure in a first position in its rotational path to cover said second aperture and a second position in its rotational path to uncover said second aperture to block and release said second air stream, respectively, and wherein positions of said plate intermediate of said first and second positions provide varying degrees of blockage to said second air stream to control the flow of air through said enclosure and to control the temperature of said objects within said enclosure, said plate being generally positioned in the horizontal plane and located on top of said enclosure, said plate being rotated to a position that only partially blocks said second air stream by said air stream impinging on said plate, the degree of blockage of said second air stream being controlled by the weight of said plate, the amount of flow within said second air stream and the pressure of said second air stream, the adjustment of the weight of said plate providing one means of varying the blockage of said second air stream and consequently the temperature of the objects within said enclosure.

2. Apparatus as claimed in claim 1 wherein said heating and air conditioning system is contained within a vehicle, said vent is located on the dash board of said vehicle and said apparatus is attached to the dash board of said vehicle about said vent by means of said mating fibers.

3. Apparatus as claimed in claim 1 wherein said plate also provides access to the inside of said enclosure to place said objects within said enclosure.

4. Apparatus as claimed in claim 1 wherein said rotatable connection of said plate to said enclosure is along a side of said second aperture that is closest to said first aperture.

* * * * *